(12) United States Patent
Kim et al.

(10) Patent No.: US 11,665,516 B2
(45) Date of Patent: May 30, 2023

(54) METHOD AND APPARATUS FOR RELAYING OR RECEIVING MESSAGE

(71) Applicant: Ettifos Co., Seoul (KR)

(72) Inventors: Hojun Kim, Yongin-si (KR); Yongtae Park, Seongnam-si (KR); Wonyong Dong, Yongin-si (KR)

(73) Assignee: ETTIFOS CO., Seoul (KR)

( * ) Notice: Subject to any disclaimer, the term of this patent is extended or adjusted under 35 U.S.C. 154(b) by 0 days.

(21) Appl. No.: 17/837,149

(22) Filed: Jun. 10, 2022

(65) Prior Publication Data

US 2023/0007454 A1 Jan. 5, 2023

(30) Foreign Application Priority Data

Jul. 2, 2021 (KR) .................. 10-2021-0087029
Jan. 26, 2022 (KR) .................. 10-2022-0011124

(51) Int. Cl.
*H04W 4/40* (2018.01)

(52) U.S. Cl.
CPC .................. *H04W 4/40* (2018.02)

(58) Field of Classification Search
CPC .................. H04W 4/40–48
See application file for complete search history.

(56) References Cited

U.S. PATENT DOCUMENTS

| | | | | |
|---|---|---|---|---|
| 9,985,946 B2* | 5/2018 | Smith | ............ | H04W 4/70 |
| 10,109,193 B2* | 10/2018 | Song | ............ | H04W 4/40 |
| 10,410,436 B2* | 9/2019 | Noh | ............ | H04W 12/069 |
| 10,663,929 B2* | 5/2020 | Law | ............ | H04L 67/125 |
| 2017/0026373 A1* | 1/2017 | Yajima | ............ | G06F 21/00 |
| 2019/0297526 A1* | 9/2019 | Das | ............ | H04W 28/0289 |
| 2020/0229032 A1 | 7/2020 | McCann et al. | | |
| 2021/0160674 A1 | 5/2021 | Takla | | |
| 2022/0021751 A1 | 7/2022 | Back et al. | | |

FOREIGN PATENT DOCUMENTS

| | | |
|---|---|---|
| CN | 107613527 | 1/2018 |
| KR | 10-2019-0032090 A | 3/2019 |
| KR | 2019-0049037 A | 5/2019 |
| KR | 10-2020-0095474 A | 8/2020 |
| KR | 10-2214558 | 2/2021 |
| WO | WO 2020/209420 A | 10/2020 |
| WO | WO 2021/118675 | 6/2021 |

* cited by examiner

*Primary Examiner* — Thomas R Cairns
(74) *Attorney, Agent, or Firm* — Radlo & Su

(57) ABSTRACT

In an aspect of the present disclosure, there is provided a road side apparatus configured to relay a message. The apparatus may include a memory, a processor, and a transceiver. The processor may be configured to: check whether an identifier received together with a received message is previously stored; when the identifier is stored, replace a personal safety message (PSM) corresponding to the identifier in a pair of the PSM and the identifier with a PSM included in the received message and the store the PSM; when a timer for batch transmission expires or when a total size of stored PSMs exceeds a predetermined value, generate one batch message including all PSMs in stored pairs of PSMs and identifiers; and transmit the generated batch message. The identifier may be information for identifying a transmitter that transmits the message.

13 Claims, 6 Drawing Sheets

METHOD AND APPARATUS FOR RELAYING OR RECEIVING MESSAGE

TECHNICAL FIELD

The present disclosure relates to a method and apparatus for relaying or receiving a message, and more particularly, to a method and apparatus for transmitting and receiving a message of a first communication standard into a message of a second communication standard for a device or subject that does not support a specific communication standard.

BACKGROUND ART

For vehicle-to-everything (V2X) communication, communication standards such as Wireless Access in Vehicular Environments (WAVE), Long Term Evolution vehicle-to-everything (LTE-V2X) sidelink, etc. have been currently used.

However, WAVE or LTE-V2X sidelink is a technology used for high-speed movement, and a pedestrian (hereinafter referred to as a vulnerable road user (VRU)) moves at a low speed and transmits a relatively small amount of data compared to data transmitted by a vehicle in long transmission cycles. Since VRU terminals that are currently distributed do not support the communication standards such as WAVE or LTE-V2X sidelink, there are barriers to entry for VRUs in the V2X communication.

In addition, if a V2X communication modem is separately provided to the VRU terminal, it may cause problems such as an increase in the price of the terminal and the speed of dissemination of new terminal devices. Therefore, it would be desirable to use communication standards supported by terminals (e.g., a smartphone) that are currently distributed to many VRUs.

Among the above communication standards, Bluetooth, and more particularly, Bluetooth Low Energy (BLE), which is judged to be supported by most VRU terminals, is optimized to periodically transmit information to the surroundings. Thus, BLE has the advantage of establishing an environment for the V2P communication only with application development.

In addition, in recent years, a modem for ultra-wideband (UWB) communication has been distributed to devices such as smartphones. The UWB communication may also be used as a communication standard for the V2P communication.

However, if a vehicle does not support BLE or UWB communication standards, the vehicle is incapable of receiving a message from any VRU.

DISCLOSURE

Technical Problem

An object of the present disclosure is to provide a method and apparatus for relaying or receiving a message.

Specifically, the object of the present disclosure is to provide a method and apparatus for relaying a message to provide compatibility between heterogeneous communication standards, and a method and apparatus for receiving such a message.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of relaying a message. The method may include: checking whether an identifier received together with a received message is previously stored; when the identifier is stored, replacing a personal safety message (PSM) in a pair of the PSM and the identifier which corresponds to the identifier with a PSM included in the received message; when a timer for batch transmission expires or when a total size of stored PSMs exceeds a predetermined value, generating one batch message including all PSMs in stored pairs of PSMs and identifiers; and transmitting the generated batch message.

Additionally or alternatively, the method may include: when the identifier is not previously stored, starting the timer for batch transmission; and storing the identifier and the PSM in the received message.

Additionally or alternatively, the batch message and the received message may be based on different communication standards or protocols.

Additionally or alternatively, the method may include deleting all stored pairs of PSMs and identifiers after transmitting the generated batch message.

Additionally or alternatively, the method may include: checking whether the PSM included in the received message is compressed; and when the PSM is compressed, decompressing the received message based on a previously stored lead message corresponding to the identifier.

Additionally or alternatively, the batch message may include an indicator indicating batch transmission and a plurality of PSMs indicated by the indicator.

Additionally or alternatively, the batch message may not include the identifier.

In another aspect of the present disclosure, there is provided an apparatus configured to relay a message. The apparatus may include: a memory; a processor; and a transceiver. The processor may be configured to: check whether an identifier received together with a received message is previously stored; when the identifier is stored, replace a PSM in a pair of the PSM and the identifier which corresponds to the identifier with a PSM included in the received message; when a timer for batch transmission expires or when a total size of stored PSMs exceeds a predetermined value, generate one batch message including all PSMs in stored pairs of PSMs and identifiers; and transmit the generated batch message.

In another aspect of the present disclosure, there is provided a method of receiving a message. The method may include: determining whether a received message is a batch message; and when the received message is the batch message, obtaining a plurality of PSMs by decoding the batch message based on an indicator indicating the batch message.

Additionally or alternatively, the method may include when the received message is not the batch message, obtaining a PSM by decoding the received message.

In another aspect of the present disclosure, there is provided an apparatus configured to receive a message. The apparatus may include: a memory; a processor; and a transceiver. The processor may be configured to: determine whether a received message is a batch message; and when the received message is the batch message, obtain a plurality of PSMs by decoding the batch message based on an indicator indicating the batch message.

Additionally or alternatively, the processor may be configured to obtain a PSM by decoding the received message when the received message is not the batch message.

In a further aspect of the present disclosure, there is provided a computer program stored on a computer-readable medium and configured to perform the above-described method It will be understood by those skilled in the art that the above-described aspects of the present disclosure are merely part of embodiments of the present disclosure and various modifications and alternatives could be developed from the following technical features of the present disclosure.

Advantageous Effects

The present disclosure has the following effects.

According to the present disclosure, conversion between heterogeneous communication standards may be supported when messages are relayed, thereby providing a device that does not support a specific communication standard with an unsupported communication standard environment.

According to the present disclosure, delayed transmission or batch transmission may be supported when messages are relayed, thereby inducing efficient use of a communication network by relaying a message depending on the message urgency.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure, illustrate embodiments of the disclosure and together with the description serve to explain the principle of the present disclosure.

BEST MODE

Figure 1:
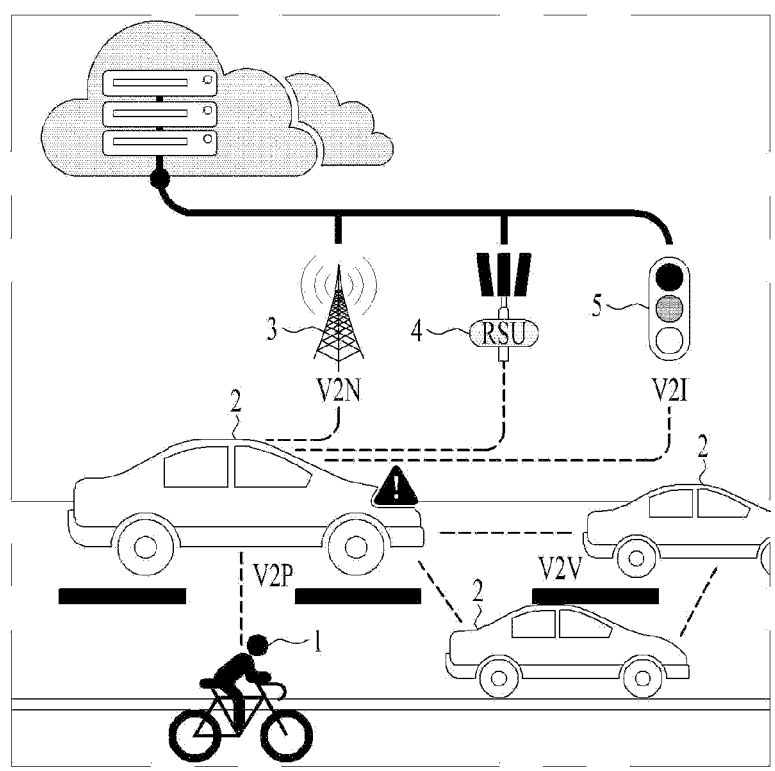
FIG. 1 illustrates a communication environment to which the present disclosure is applied.

Hereinafter, embodiments of the present disclosure will be described with reference to the accompanying drawings. However, the present disclosure is not limited to the embodiments described herein and may be implemented in various other forms. The terminology used in this specification is intended to help the understanding of the embodiments. That is, the terminology is not intended to limit the scope of the present disclosure. In addition, singular forms used herein may imply plural forms unless the forms clearly represent the opposite.

First, the terms and basic encoding methods used in this document will be described.

In this specification, once a timer starts, the timer may continue to operate until the timer stops or expires. The timer may start in an idle state, or the timer may restart while in operation. When the timer starts or restarts, the timer may always start or restart from an initial value.

In the present specification, a vehicle-to-pedestrian (V2P) or vehicle-to-everything (V2X) message refers to a message including a wireless access in vehicular environments (WAVE) short message protocol (WSMP) header of the Institute of Electrical and Electronics Engineers (IEEE) 1609.3, a security header of IEEE 1609.2, a personal safety message (PSM) of IEEE 1609.2 and the Society of Automotive Engineers (SAE) J2735, and so on. Hereinafter, the V2P or V2X message will be described in brief.

As an example of generating the V2P or V2X message, three layers may be used. The three layers are an application layer, a security layer, and a network layer in order from higher to lower layers.

The PSM of IEEE 1609.2 SAE J2735 is data in the form of a message frame, which is obtained by encoding based on unaligned packed encoding rules (UPER). The PSM may include specific information that a vulnerable road user (VRU) desires to transmit to a vehicle, for example, information on the temporary identifier (ID), type, location, direction, speed, and so on of the VRU. However, the information is not limited thereto. In addition, the name of the PSM itself is not intended to limit the scope of the present disclosure, and the PSM may be understood and interpreted as information related to the VRU.

Security data of IEEE 1609.2 consists of the PSM of IEEE 1609.2 SAE J2735 PSM and the security header of IEEE 1609.2 described above. The security header of IEEE 1609.2 includes certificate information to sign the PSM and signature information about the PSM, which is encoded by octet encoding rules (OER).

A WSMP message of IEEE 1609.3 consists of the security data of IEEE 1609.2 used for V2P communication and the WSMP header of IEEE 1609.3. The WSMP header of IEEE 1609.3 includes characteristic information on a vehicle-to-everything (V2X) communication means, which is encoded by the UPER.

Herein, V2P messages are largely divided into two types: a lead message and a compressed message. The lead message refers to a V2P message including a non-compressed PSM and transmitted with a new identifier. The compressed message refers to a V2P message including a compressed PSM and transmitted together with the identifier of the lead message after transmission of the lead message. That is, the V2P message includes the lead message and the compressed message, and these messages may be called various names.

FIG. 1 illustrates a communication environment to which the present disclosure is applied.

V2X refers to a communication system involving wireless communication between a vehicle 2 and a vehicle 2 (vehicle-to-vehicle (V2V)). V2V not only plays a basic role of notifying nearby vehicles of information such as the location, direction, and speed of a vehicle but also serves to inform potential hazards such as sudden braking and turning.

In addition, V2X refers to a system in which a vehicle communicates and shares with various elements on a road for autonomous driving, which involves wireless communication between a vehicle and a network 3 (vehicle-to-network (V2N)), wireless communication between a vehicle and a road side unit (RSU) 4, and wireless communication between a vehicle and transportation infrastructure 5 (vehicle-to-infrastructure (V2I)).

Vehicles may inform each other of danger based on communication therebetween and check information such as parking locations and signal change times based on communication between the vehicles and transportation infrastructure such as parking lots and traffic lights. Thus, V2X is considered as a necessary technology for perfect autonomous driving.

In addition, V2X communication may also be extended to a person 1 around the road. Such communication is referred to as V2P. The present disclosure will be described in the context of V2X communication.

Figure 2:
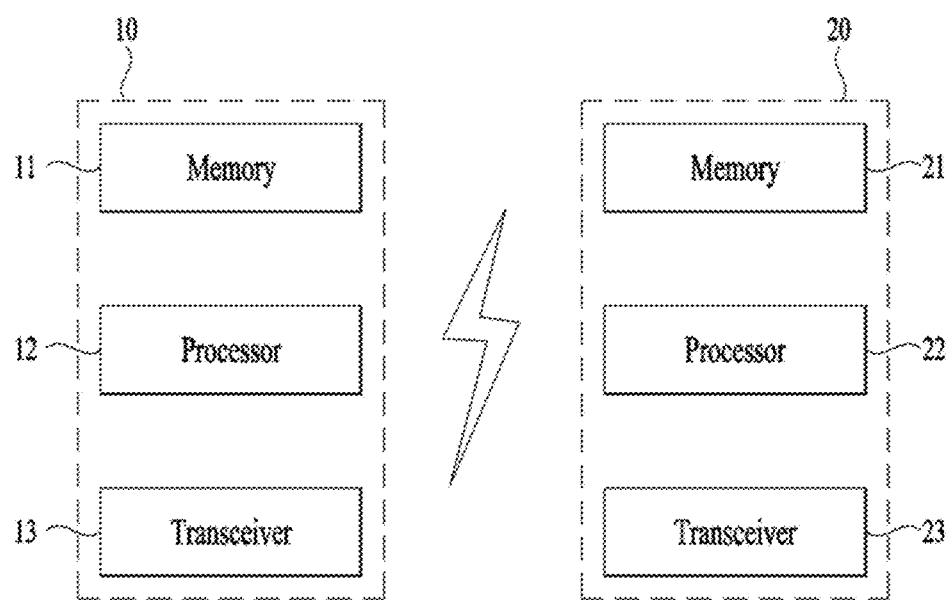
FIG. 2 is a block diagram of a transmitting device and a receiving device according to an embodiment of the present disclosure.

FIG. 2 is a block diagram of a transmitting device 10 and a receiving device 20 according to an embodiment of the present disclosure.

The transmitting device 10 refers to a device performing transmission, for example, transmission of messages for V2P or V2X communication. However, since communication always involves transmission and reception, the transmission device 10 may also receive messages.

The transmitting device 10 may include: a memory 11 configured to store messages, information, etc.; a processor 12 configured to process messages, information, etc.; and a transceiver 13 configured to transmit or receive messages, information, etc.

The receiving device 20 refers to a device performing reception, for example, reception of messages for V2P or V2X communication. The receiving device 20 may also transmit messages.

The receiving device 20 may include: a memory 21 configured to store messages, information, etc.; a processor 22 configured to process messages, information, etc.; and a transceiver 23 configured to transmit or receive messages, information, etc.

If the transmitting device 10 is a VRU terminal, the receiving device 20 may be an RSU or an on-board unit (OBU) located around the road. If the transmitting device 10 is an RSU or an OBU located around the road, the receiving device 20 may be a terminal mounted on a vehicle. In addition, the transmitting device 10 and the receiving device 20 are not limited to the names mentioned herein, and the transmitting device 10 and the receiving device 20 may be included or mounted in various devices, units, machines, and the like.

Hereinafter, the proposals of the present disclosure will be described in brief.

Figure 3:
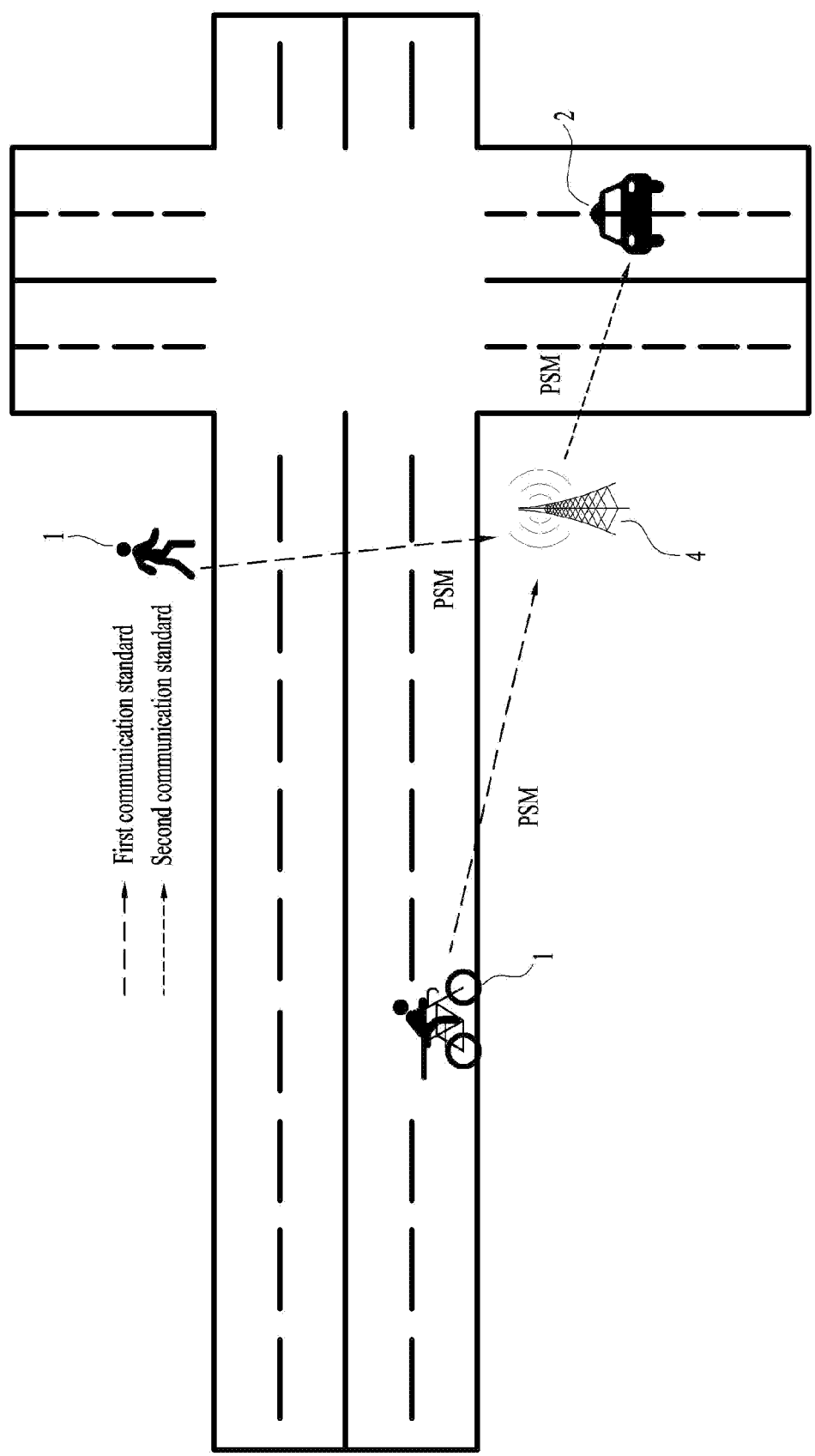
FIG. 3 is a diagram for explaining an operation of relaying messages according to an embodiment of the present disclosure.

FIG. 3 is a diagram for explaining an operation of relaying V2P or V2X messages according to the present disclosure. An RSU 4 may receive a V2P message including a PSM from a VRU 1. Transmission and reception of such a V2P message may be performed according to a first communication standard (e.g., BLE or UWB). The RSU 4 may transmit (i.e., relay) a V2X message including the received PSM to a vehicle 2. The V2X message may be transmitted according to a second communication standard (e.g., WAVE or LTE-V2X).

According to a first embodiment of the present disclosure, the transmitting device 10 may support batch transmission when relaying a message. In the present specification, batch transmission means that, among messages received from transmitting subjects (e.g., VRUs), only the latest messages from each sender are bundled and transmitted. Batch transmission may also be referred to as delayed transmission because there is a time delay between message reception and message transmission.

Referring again to FIG. 2, the transmitting device 10 is a device for transmitting messages. In the present specification, a message includes a V2P message or a V2X message, and the scope of present disclosure is not limited to the name of the message. In addition, the transmitting device 10 may receive a message and forward (i.e., relay) the received message to another device.

The processor 12 of the transmitting device 10 may receive a V2P message through the transceiver 13. The processor 12 of the transmitting device 10 may check whether an identifier included in the received V2P message is previously stored in the memory 11. If the identifier is stored, the processor 12 may replace a PSM, which corresponds to the previously stored identifier, in a pair of the PSM and the identifier with a PSM included in the received V2P message. Upon receiving the V2P message, the processor 12 may store the identifier and the PSM included in the V2P message in the memory 11. Herein, replacing means replacing a PSM in a previously stored pair of {identifier, PSM} with a PSM in a received V2P message and storing the latter PSM.

Thereafter, the processor 12 may check whether a timer for batch transmission expires or whether the total size of stored PSMs exceeds a predetermined value. When the timer for batch transmission expires or when the total size of the stored PSMs exceeds the predetermined value, the processor 12 may generate one batch message by bundling the stored PSMs of all stored pairs of PSMs and identifiers. Here, the batch message is based on a communication standard or protocol different from that of the received V2P message. For example, the batch message corresponds to a V2X message. Since V2P and V2X messages use different physical (PHY) layers and different medium access control (MAC) layers, channel coding and resource mapping for the V2P and V2X messages may be different.

The batch message may include information indicating batch transmission in order to allow the receiving device 20 to recognize the batch transmission. For example, the information indicating the batch transmission may be included as data in the form of a message frame of SAE J2735. That is, an indicator (or ID) indicating batch transmission may be added to the message frame, and the indicator may represent a batch message, i.e., a plurality of PSMs. The batch message may also include the plurality of PSMs indicated by the indicator.

However, the batch message may not include the above-described identifier. That is, the identifier is used only for a first link (e.g., V2P link) but not used for a second link (e.g., V2X link).

The processor 12 may transmit (i.e., relay) the generated batch message to the receiving device 20 through the transceiver 13.

If the receiving device 20 is incapable of directly receiving a V2P message from a subject such as an RSU (e.g., if the receiving device 20 has no V2P communication capability), the transmitting device 10 may provide the V2P message to the receiving device 20 as a V2X message according to the above-described relay procedure.

The transmitting device 10 may generate a batch message based on a timer. Specifically, the transmitting device 10 may match the latest PSM for each identifier and then store the latest PSM for each identifier in the memory 11. In addition, the transmitting device 10 may generate and transmit the latest PSMs for individual identifiers as one batch message, thereby maintaining the latest PSMs.

According to a second embodiment of the present disclosure, the transmitting device 10 may support non-delayed transmission when relaying a message. The term "non-delayed transmission" means retransmission of a received message with no time delay. Accordingly, the non-delayed transmission may be referred to as non-bundled transmission due to the difference from the above-described batch transmission.

The processor 12 may receive a V2P message through the transceiver 13. The processor 12 may generate a second V2P message based on the received V2P message. The second V2P message may be based on a communication standard or protocol different from the received V2P message. The processor 12 may transmit the second V2P message through the transceiver 13.

As in the first embodiment, if the receiving device 20 is incapable of directly receiving a V2P message from a subject such as an RSU (e.g., if the receiving device 20 has no V2P communication capability), the transmitting device 10 may provide the V2P message to the receiving device 20 as a V2X message according to the above-described relay procedure.

The procedure for transmitting V2P or V2X messages has been described with reference to FIG. 2. Hereinafter, a procedure for receiving V2P or V2X messages will be described.

According to the first embodiment of the present disclosure, batch transmission may be supported. The receiving device 20 is a device for receiving messages. The processor 22 of the receiving device 20 may receive a batch message from the transmitting device 10 through the transceiver 23. The processor 22 may decode the received batch message to obtain individual PSMs included in the received batch message. The processor 22 may provide the PSMs to applications.

However, the receiving device 20 needs to have an ability to receive batch messages. If the receiving device 20 has no ability to receive batch messages, the receiving device 20 may not decode any batch message. In this case, the receiving device 20 may discard a received batch message.

If the receiving device 20 is capable of receiving a batch message, the receiving device 20 may decode the batch message to obtain an indicator indicating batch transmission. The receiving device 20 may obtain PSMs indicated by the indicator based on the indicator indicating the batch transmission. Since the batch message is provided in the form of a list, elements in the list may correspond to PSMs.

According to the second embodiment of the present disclosure, non-delayed transmission may be supported. The processor 22 of the receiving device 20 may receive a message from the transmitting device 10 through the transceiver 23. The processor 22 may decode the received message to obtain a PSM. The processor may provide the PSM to applications.

Hereinafter, the proposals of the present disclosure will be described with reference to the remaining drawings.

Generation or Compression of Messages

Referring to FIG. 3, a transmitting device (i.e., RSU 4) may receive a message from a subject such as the VRU 1 and then relay the message to the vehicle 2. In this case, the message received from the subject such as the VRU 1 may be compressed, which will be described. In other words, generation or compression of a message by the VRU 1 will be described.

The message transmitted by the subject such as the VRU 1 may be, for example, a V2P message. The V2P message basically includes a PSM. The PSM may include information about the temporary identifier, type, location, direction, and speed of a VRU as described above, but the present disclosure is not limited thereto. That is, the PSM may include various information related to the VRU.

The subject such as the VRU 1 (hereinafter such a subject is referred to as the VRU 1 for simplicity) may use an identifier for compression of a V2P message. The identifier is information for indicating a lead message to be referred to when a compressed message is encoded or decoded. Therefore, when the VRU 1 transmits the V2P message, the VRU 1 transmits the identifier together.

After performing initial transmission, the VRU 1 may compress a new message to be transmitted based on the initially transmitted lead message (i.e., based on the lead message) for a predetermined time. In this case, the VRU 1 may transmit the compressed message together with the identifier.

Hereinafter, a method of compressing a V2P message will be described in detail. The V2P message compression method is based on the V2P message generation method described above.

A processor (or message compressor) of the VRU 1 may remove a predetermined field (e.g., a field having a static characteristic) from headers to be attached to a generated IEEE 1609.2 SAE J2735 PSM. In the present specification, removing a field means that a field in headers included in an uncompressed message such as a lead message is excluded from a message. The processor of the VRU 1 may calculate another predetermined field (e.g., a field represented by a delta value) based on the lead message, and such a field may include only the delta value. In this case, the delta value means a value indicating a difference from the field value of the lead message. Information in this state may be referred to as a compressed PSM. The processor of the VRU 1 may encode the compressed PSM based on UPER.

Next, the processor of the VRU 1 may generate security data of IEEE 1609.2 where the encoded compressed PSM is used as ToBeSignedData. The processor of the VRU 1 may remove a predetermined field (e.g., a field having a static characteristic) from headers of the security data of IEEE 1609.2 based on the security data of IEEE 1609.2 in the lead message. The processor of the VRU 1 may calculate another predetermined field (e.g., a field represented by a delta value) based on the lead message, and such a field may include only the delta value. Information in this state may be referred to as compressed IEEE 1609.2 security data. The processor of the VRU 1 may encode the compressed IEEE 1609.2 security data based on OER.

Then, the processor of the VRU 1 may generate a WSMP message of IEEE 1609.3 including the encoded compressed IEEE 1609.2 security data. In this case, a predetermined field (e.g., a field having a static characteristic) may be removed from headers of the WSMP message of IEEE 1609.3. The processor of the VRU 1 may calculate another predetermined field (e.g., a field represented by a delta value) based on the lead message, and such a field may include only the delta value. Information in this state may be referred to as a compressed WSMP message. The processor of the VRU 1 may encode the compressed WSMP message based on the UPER.

Such a message generated after compression may be referred to as a compressed V2P message.

On the other hand, the first bit of a lead/compressed V2P message may be used as indicator information indicating whether the message is compressed. For example, 0 may indicate that the message is not compressed, and 1 may indicate that the message is compressed.

The processor of the VRU 1 may request a communication unit such as the transceiver to transmit the compressed V2P message including the previously stored identifier and the compressed PSM.

The communication unit of the VRU 1 may transmit the compressed V2P message through the transceiver.

Decompression or Decoding of Messages

Hereinafter, it will be described how a subject such as the RSU 4 (hereinafter such a subject is referred to as the RSU 4 for simplicity) receives, decompresses, or decodes a message compressed and transmitted by the VRU 1.

The RSU 4 may receive a lead or compressed V2P message from the VRU 1 through a communication unit such as the transceiver. In this case, an identifier may be received together.

The RSU 4 may check a compression indicator in the received V2P message and check whether the received V2P message is compressed.

If it is confirmed that the received V2P message is not compressed, the RSU 4 may store the received V2P message in the memory together with the received identifier. Preferably, the received V2P message may be stored after being matching with the received identifier. In addition, the RSU 4 may forward the received V2P message to a message using unit such as an application.

If it is confirmed that the received V2P message is compressed, the RSU 4 may decompress the compressed V2P message. The decompression method will be described in detail.

The RSU 4 may check the identifier received together with the V2P message. If the received identifier is identical to a previously stored identifier, the RSU 4 may confirm that the lead message is equivalent to the previously stored identifier.

The RSU 4 may recover a WSMP header of IEEE 1609.3 in the received compressed V2P message from a WSMP header of IEEE 1609.3 in the lead message at network layers. As the field value of a predetermined field (e.g., a field having a static characteristic) in the WSMP header of IEEE 1609.3, the value of the same field in the lead message may be used.

In addition, the field value (i.e., delta value) of another predetermined field (e.g., a field represented by a delta value) of the WSMP header of IEEE 1609.3 may be obtained from the value of the same field in the lead message. For example, a value obtained by adding the value of a specific field to the value of the same field of the lead message may be used. The RSU 4 may acquire security data of IEEE 1609.2 based on the recovered WSMP header.

Thereafter, the RSU 4 may obtain a security header of IEEE 1609.2 at security layers according to the same method as the method of obtaining the WSMP header of IEEE 1609.3 described above. The RSU 4 may obtain a PSM of IEEE 1609.2 SAE J2735 based on the obtained IEEE 1609.2 security header.

In addition, for the PSM of IEEE 1609.2 SAE J2735, the RSU 4 may obtain a header at application layers according to the same method as the method of obtaining the WSMP header of IEEE 1609.3 described above. The RSU 4 may obtain the PSM based on the obtained header.

The RSU 4 may forward the obtained PSM to a message using unit such as an application.

Figure 4:
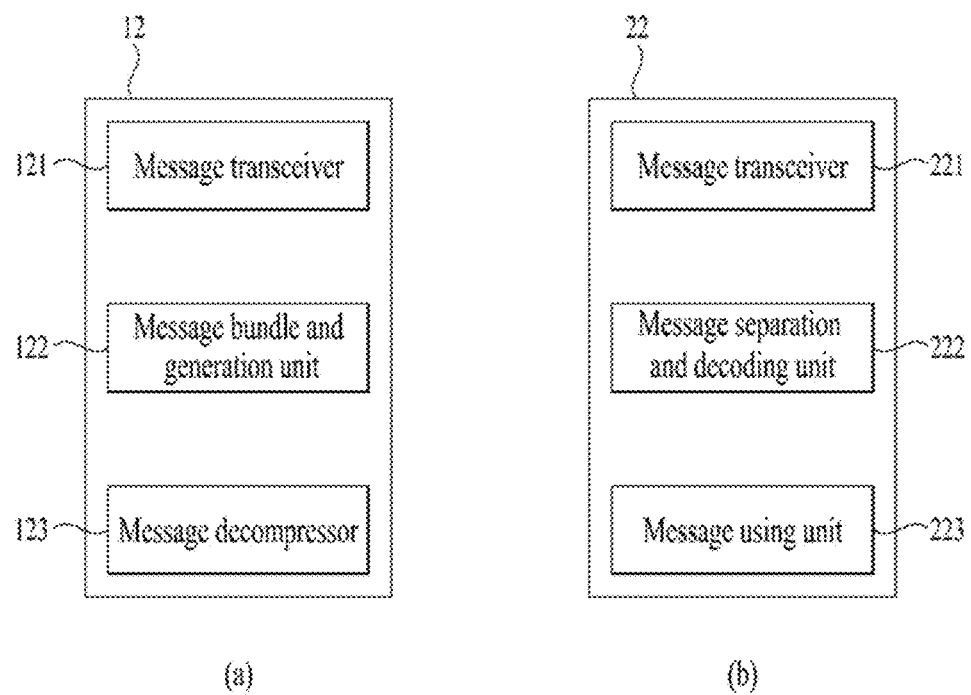
FIG. 4 is a block diagram of processors of transmitting and receiving devices according to an embodiment of the present disclosure.

FIG. 4 is a block diagram of processors of transmitting and receiving devices according to an embodiment of the present disclosure.

The processor 12 of the transmitting device 10 may include a message transceiver 121, a message bundle and generation unit 122, and a message decompressor 123. The processor 22 of the receiving device 20 may include a message transceiver 221, a message separator 222, and a message using unit 223. The names of the components of the processors 12 and 22 are merely exemplary, and the scope of the present disclosure is not limited thereto.

The processor 12 of the transmitting device 10 may check whether a PSM included in a received V2P message is compressed. If the PSM included in the received V2P message is compressed, the message decompressor 123 of the transmitting device 10 may decompress the received V2P message based on a previously stored lead V2P message corresponding to an identifier received together with the received V2P message. After the decompression, the processor 12 may obtain the PSM. If the PSM included in the received V2P message is not compressed, the processor 12 of the transmitting device 10 may decode the received V2P message to obtain the PSM.

In the first embodiment of the present disclosure, batch transmission is supported, which will be described first. Such a situation may be referred to as a case in which batch transmission is configured. In the following, it is assumed that the processor 12 of the transmitting device 10 checks whether batch transmission is configured and confirms that the batch transmission is configured.

The processor 12 of the transmitting device 10 may check whether an identifier received together with a received V2P message is previously stored in the memory 11. If the identifier is previously stored, the processor 12 may replace a PSM, which corresponds to the identifier, in a pair of the PSM and the identifier with a PSM included in the received V2P message. Herein, replacing a PSM may include storing the PSM as well.

If the identifier is not previously stored, the processor 12 may start a timer for batch transmission and store the identifier and the PSM included in the received V2P message in the memory 11.

Until the timer for batch transmission expires or the total size of stored PSMs exceeds a predetermined value, the transmitting device 10 may receive V2P messages through the message transceiver 121, match PSMs and identifiers, which are received with the V2P messages, and store the PSMs and identifiers in the memory 11.

When the timer for batch transmission expires or the total size of the stored PSMs exceeds the predetermined value, the message bundle and generation unit 122 of the transmitting device 10 may generate one batch message by bundling the PSMs in all pairs of PSMs and identifiers, which are stored in the memory 11. In other words, the message bundle and generation unit 122 of the transmitting device 10 may generate the batch message including all of the stored PSMs.

As mentioned above, the generated batch message and the received V2P message may be based on different communication standards or protocols.

After transmitting the generated batch message, the processor 12 may delete all pairs of PSMs and identifiers stored in the memory 11.

In the second embodiment of the present disclosure, batch transmission is not supported (that is, non-delayed transmission is supported), which will be described. Such a situation may be referred to as a case in which non-delayed transmission is configured. In the following, it is assumed that the processor 12 of the transmitting device 10 checks whether non-delayed transmission is configured and confirms that the non-delayed transmission is configured.

When the non-delayed transmission is configured, message bundling is not performed. The message transceiver 121 may receive a V2P message. Then, the message bundle and generation unit 122 may generate a V2X message based on the received V2P message. The message transceiver 121 may transmit the V2X message. In this case, the V2X message may be based on a communication standard or protocol different from that of the received V2P message.

Hereinafter, the processor 22 of the receiving device 20 will be described.

According to the first embodiment of the present disclosure, batch transmission is supported. The message transceiver 221 of the receiving device 20 may receive a batch message from the transmitting device 10 through the transceiver 23. The receiving device 20 may check whether the batch message is received. Specifically, the batch message may include an indicator indicating that the corresponding transmission is batch transmission and also include a plurality of PSMs indicated by the indicator. That is, the receiving device 20 may check whether the received message includes the indicator indicating batch transmission. When the received message includes the indicator, the receiving device 20 may recognize that the batch message is received.

The message separator 222 may decode the received batch message to obtain the plurality of PSMs included therein. The message separation and decoding unit 222 may forward the PSMs to the message using unit 223.

According to the second embodiment of the present disclosure, non-delayed transmission is supported. The message transceiver 221 of the receiving device 20 may receive a V2X message from the transmitting device 10 through the transceiver 23. The message separation and decoding unit 222 may decode the received V2X message to obtain a PSM. The processor 22 may transmit the PSM to the message using unit 223.

Figure 5:
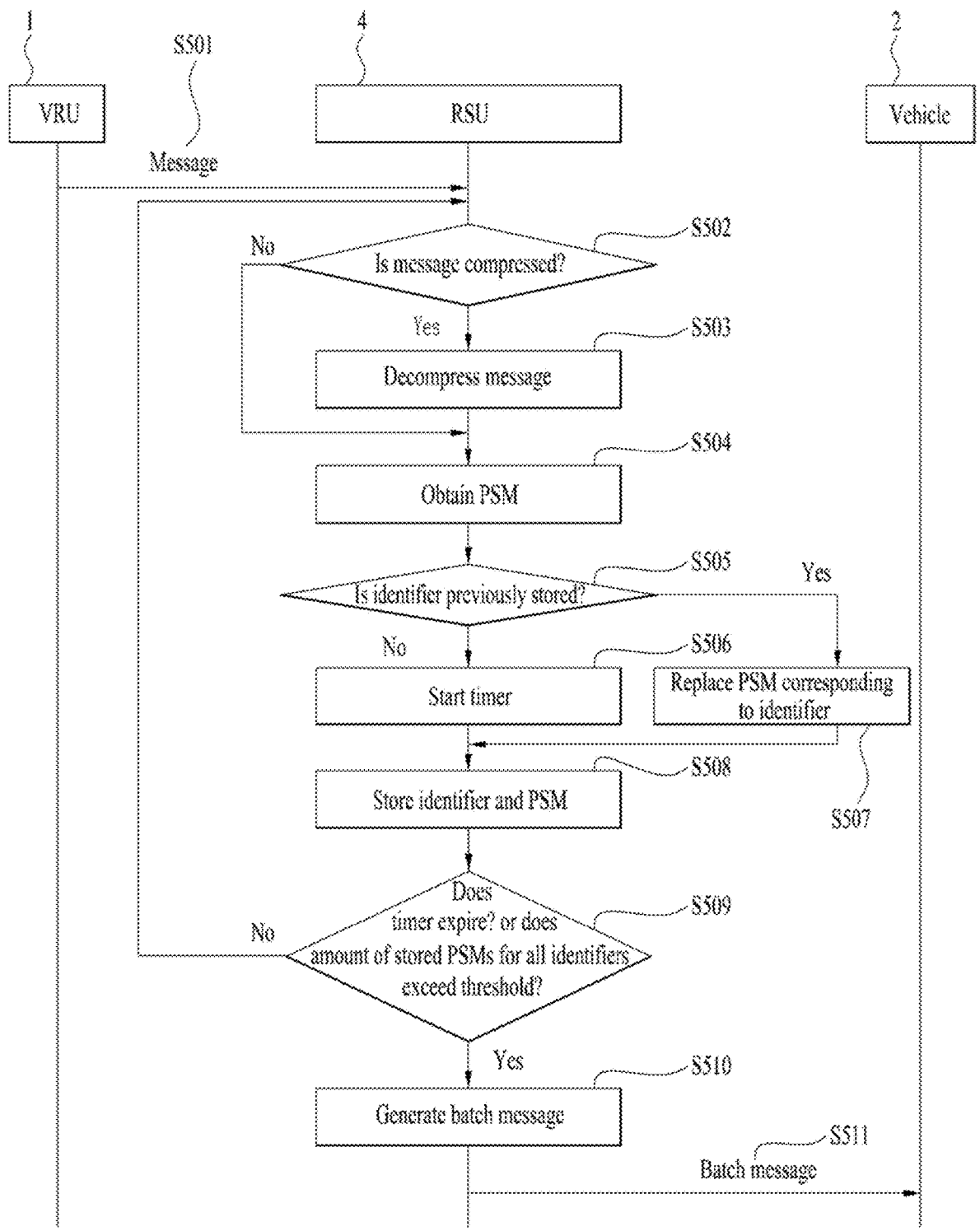
FIG. 5 is a flowchart of operations of relaying a message according to an embodiment of the present disclosure.

FIG. 5 is a flowchart of operations of relaying a message according to the first embodiment of the present disclosure.

The RSU 4 may receive a message from the VRU 1 (S501). The received message may be a V2P message, but present disclosure is not limited thereto. In this case, an identifier may be received together with the message.

The RSU 4 may check whether the received message is compressed (S502). If the received message is compressed, the RSU 4 may decompress the received message (S503). After the decompression, the RSU 4 may obtain a PSM (S504).

If the received message is not compressed, the RSU 4 may obtain the PSM from the received message (S504).

The RSU 4 may check whether the identifier received together with the message in S501 is equivalent to a previously stored identifier (S505).

If the identifier received together with the received message is not equivalent to the previously stored identifier, the RSU 4 may start a timer for batch transmission (S506). If the identifier received together with the received message is equivalent to the previously stored identifier, the RSU 4 may replace a PSM, which corresponds to the identifier, in a previously stored pair of the PSM and the identifier with the PSM included in the message received in S501 (S507).

The RSU 4 may match and store the identifier and the PSM (S508). That is, the identifier and the PSM may be stored as a pair.

The RSU 4 may check whether the timer for batch transmission expires or whether the amount of PSMs stored for all identifiers exceeds a threshold (S509). If the timer does not expire or if the amount of PSMs stored for all identifiers does not exceed the threshold, the RSU 4 may wait for a message from the VRU 1.

If the timer for batch transmission expires or if the amount of PSMs stored for all identifiers exceeds the threshold, the RSU 4 may generate a batch message (S510). The batch message may include all PSMs included in all stored pairs of PSMs and identifiers. In particular, the batch message may include the most recent PSMs transmitted by several VRUs. Thereafter, the RSU 4 may transmit the batch message to the vehicle 2 (S511). In this case, the batch message and the message received in S501 may be based on different communication standards or protocols.

The batch message may include an indicator indicating batch transmission and a plurality of PSMs. However, as described above, the batch message does not include the identifier received from the VRU 1.

The vehicle 2 may check whether the received message is a batch message. If the received message is the batch message, the vehicle 2 may obtain a plurality of PSMs by decoding the batch message based on the batch message or an indicator indicating batch transmission. If the received message is not the batch message, the vehicle 2 may decode the received message to obtain a PSM.

Figure 6:
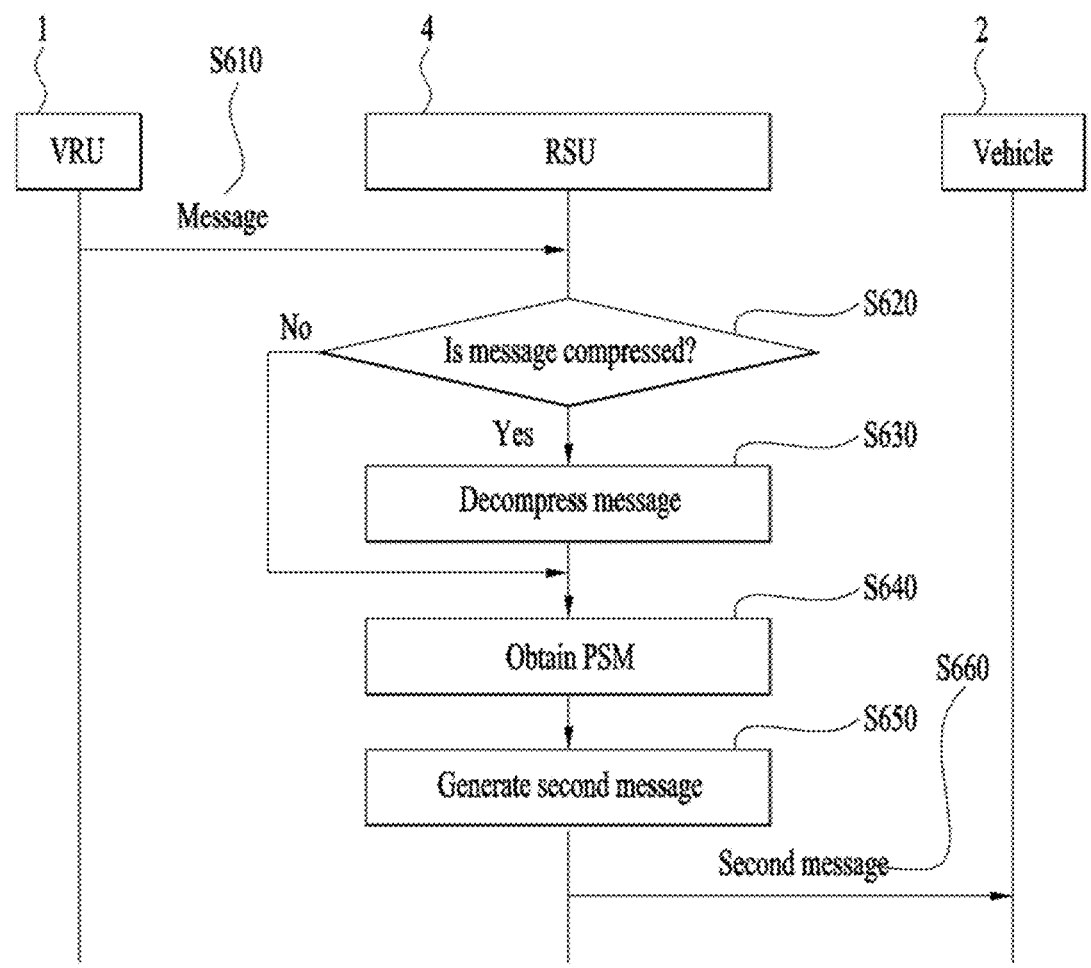
FIG. 6 is a flowchart of operations of relaying a message according to an embodiment of the present disclosure.

FIG. 6 is a flowchart of operations of relaying a message according to the second embodiment of the present disclosure.

The RSU 4 may receive a message from the VRU 1 (S610). The received message may be a V2P message, but present disclosure is not limited thereto.

The RSU 4 may check whether the received message is compressed (S620). If the received message is compressed, the RSU 4 may decompress the received message (S630). After the decompression, the RSU 4 may obtain a PSM (S640).

If the received message is not compressed, the RSU 4 may obtain the PSM from the received message (S640).

The RSU 4 may generate a second message based on the obtained PSM (S650). The second message and the message received in S610 may be based on different communication standards or protocols.

The RSU 4 may transmit the second message to the vehicle 2 (S660).

The vehicle 2 may check whether the received message is a batch message. If the received message is the batch message, the vehicle 2 may obtain a plurality of PSMs by decoding the batch message based on the batch message or an indicator indicating batch transmission. If the received message is not the batch message, the vehicle 2 may decode the received message to obtain a PSM.

Details of message relaying according to the present disclosure that has not been described with reference to FIGS. 5 and 6 could be found in the details provided with reference to FIGS. 2 to 4.

It has been described that the methods or procedures of the present disclosure are performed by the devices and components included therein (e.g., memories 11 and 21, processors 12 and 22, transceivers 13 and 23, message transceiver 121, message bundle and generation unit 122, message decompressor 123, message transceiver 221, message separation and decoding unit 222, message using unit 223, etc.). However, the names of the device and components included therein are merely exemplary, and the scope of the present disclosure is not limited thereto. In other words, the methods or procedures of the present disclosure may be performed by others rather than the devices. In addition, the methods or procedures may be performed by software for message relaying and reception or code readable by computers or other machines or devices.

In this document, messages are specifically named such as "V2P message", "V2X message", and so on. However, the messages names are merely exemplary, and the scope of the present disclosure is not limited thereto.

In another aspect of the present disclosure, the above-described proposals or operations may be provided as code that is capable of being implemented, performed, or executed by computers (herein, the computer is a comprehensive concept including a system on chip (SoC), a processor, a microprocessor etc.) or a computer-readable storage medium or computer program product storing or including the code. The scope of the present disclosure may be extended to the code or the computer-readable storage medium or computer program product storing or including the code.

The preferred embodiments of the present disclosure are provided to allow those skilled in the art to implement and embody the present disclosure. While the present disclosure has been described and illustrated herein with reference to the preferred embodiments thereof, it is understood to those skilled in the art that various modifications and variations could be made therein without departing from the spirit and scope of the disclosure. Therefore, the present disclosure is not limited to the embodiments disclosed herein but intends to give the broadest scope consistent with the new principles and features disclosed herein.

The invention claimed is:

1. A method of relaying a message, the method comprising:
   receiving a message and an identifier;
   checking whether the identifier either is stored or was previously stored;
   determining that the identifier was previously stored, replacing a personal safety message (PSM) in a stored pair of the PSM and the identifier with a PSM included in the received message;
   in response to an expiration of a timer for batch transmission or excess of a total size of stored PSMs over a predetermined value, generating one batch message including all PSMs in stored pairs of PSMs and identifiers; and
   transmitting the generated batch message,
   wherein the batch message does not include the identifier.

2. The method of claim 1, comprising:
   when the identifier is not previously stored, starting the timer for batch transmission; and
   storing the identifier and the PSM included in the received message.

3. The method of claim 1, wherein the batch message and the received message are based on different communication standards or protocols.

4. The method of claim 1, comprising deleting all stored pairs of PSMs and identifiers after transmitting the generated batch message.

5. The method of claim 1, comprising:
   checking whether the PSM included in the received message is compressed; and
   when the PSM is compressed, decompressing the received message based on a previously stored lead message corresponding to the identifier.

6. The method of claim 1, wherein the batch message includes an indicator indicating batch transmission and a plurality of PSMs indicated by the indicator.

7. An apparatus configured to relay a message, the apparatus comprising:
   a memory;
   a processor; and
   a transceiver;
   wherein the processor is configured to:
   receive a message and an identifier;
   check whether the identifier either is stored or was previously stored;
   determining that the identifier was previously stored, replace a personal safety message (PSM) in a stored pair of the PSM and the identifier with a PSM included in the received message;
   in response to an expiration of a timer for batch transmission expires or excess of a total size of stored PSMs over a predetermined value, generate one batch message including all PSMs in stored pairs of PSMs and identifiers; and
   transmit the generated hatch message,
   wherein the batch message does not include the identifier.

8. A method of receiving a batch message generated by a method in accordance with at least one of claims 1 to 6, the method comprising:
   determining whether a received message is the batch message; and
   in response to the determination of the batch message being received, obtaining a plurality of personal safety messages (PSMs) by decoding the batch message based on an indicator indicating the batch message.

9. The method of claim 8, comprising when the received message is not the batch message, obtaining a PSM by decoding the received message.

10. An apparatus configured to receive a batch message generated by the apparatus of claim 7, the apparatus comprising:
    a memory;
    a processor; and
    a transceiver;
    wherein the processor is configured to:
    determine whether a received message is a batch message; and
    in response to the determination of the batch message being received, obtain a plurality of personal safety messages (PSMs) by decoding the batch message based on an indicator indicating the batch message.

11. The apparatus of claim 10, wherein the processor is configured to obtain a PSM by decoding the received message when the received message is not the batch message.

12. A non-transitory computer-readable medium having stored thereon a computer program configured to perform the method defined in claim 1.

13. A non-transitory computer-readable medium having stored thereon a computer program configured to perform the method defined in claim 8.

* * * * *